United States Patent
Rayl et al.

(10) Patent No.: US 6,736,108 B2
(45) Date of Patent: May 18, 2004

(54) FUEL AND SPARK COMPENSATION FOR REACTIVATING CYLINDERS IN A VARIABLE DISPLACEMENT ENGINE

(75) Inventors: Allen B. Rayl, Waterford, MI (US); William R. Aro, Detroit, MI (US); Gregory Paul Matthews, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 63 days.

(21) Appl. No.: 10/150,640

(22) Filed: May 16, 2002

(65) Prior Publication Data

US 2003/0213468 A1 Nov. 20, 2003

(51) Int. Cl.[7] .............................. F02D 17/02; F02P 5/15
(52) U.S. Cl. .............................. 123/406.23; 123/198 F; 123/406.47; 123/481
(58) Field of Search ....................... 123/198 F, 406.23, 123/406.24, 406.45, 406.47, 481

(56) References Cited

U.S. PATENT DOCUMENTS

| | | | | |
|---|---|---|---|---|
| 4,262,640 A | * | 4/1981 | Clark | 123/198 F |
| 4,759,327 A | * | 7/1988 | Nagano et al. | 123/406.24 |
| 5,374,224 A | * | 12/1994 | Huffmaster et al. | 123/198 F |
| 5,720,257 A | * | 2/1998 | Motose et al. | 123/481 X |
| 5,727,527 A | * | 3/1998 | Mueller et al. | 123/481 |
| 5,839,409 A | * | 11/1998 | Denz et al. | 123/481 X |
| 6,360,713 B1 | * | 3/2002 | Kolmanovsky et al. | 123/295 |
| 6,615,804 B2 | * | 9/2003 | Matthews et al. | 123/481 |

* cited by examiner

Primary Examiner—Tony M. Argenbright
(74) Attorney, Agent, or Firm—Christopher DeVries

(57) ABSTRACT

An engine control system in a vehicle including a variable displacement internal combustion engine, an intake manifold coupled to the variable displacement internal combustion engine, a controller for controlling the displacement of the variable displacement internal combustion engine, and where the controller varies the spark for a reactivating cylinder during the transition from deactivation to reactivation.

12 Claims, 4 Drawing Sheets

FUEL AND SPARK COMPENSATION FOR REACTIVATING CYLINDERS IN A VARIABLE DISPLACEMENT ENGINE

TECHNICAL FIELD

The present invention relates to the control of internal combustion engines. More specifically, the present invention relates to a method and apparatus to control a variable displacement internal combustion engine.

BACKGROUND OF THE INVENTION

Present regulatory conditions in the automotive market have led to an increasing demand to improve fuel economy and reduce emissions in present vehicles. These regulatory conditions must be balanced with the demands of a consumer for high performance and quick response for a vehicle. Variable displacement internal combustion engines (ICEs) provide for improved fuel economy, as compared to fixed displacement ICEs, and torque on demand by operating on the principal of cylinder deactivation. During operating conditions that require high output torque, every cylinder of a variable displacement ICE is supplied with fuel and air to provide torque for the ICE. During operating conditions at low speed, low load, and/or other inefficient conditions for a fully-displaced ICE, cylinders may be deactivated to improve fuel economy for the variable displacement ICE and vehicle. For example, in the operation of a vehicle equipped with an eight cylinder variable displacement ICE, fuel economy will be improved if the ICE is operated with only four cylinders during low torque operating conditions by reducing throttling losses. Throttling losses, also known as pumping losses, are the extra work that an ICE must perform to pump air from the relatively low pressure of an intake manifold, across a throttle body or plate, through the ICE and out to the atmosphere. The cylinders that are deactivated will not allow air flow through their intake and exhaust valves, reducing pumping losses by forcing the ICE to operate at a higher intake manifold pressure. Since the deactivated cylinders do not allow air to flow, additional losses are avoided by operating the deactivated cylinders as "air springs" due to the compression and decompression of the air in each deactivated cylinder.

During the reactivation process, when formerly deactivated cylinders are provided with air and fuel, a torque lag may occur. The reactivated cylinders may not return to their normal reactivation torque values, creating torque disturbances in the operation of the variable displacement engine.

SUMMARY OF THE INVENTION

The present invention is a method and apparatus for the control of cylinder deactivation in a variable displacement engine to improve the torque output of cylinders upon their reactivation.

DESCRIPTION OF THE PREFERRED EMBODIMENT

Figure 1:
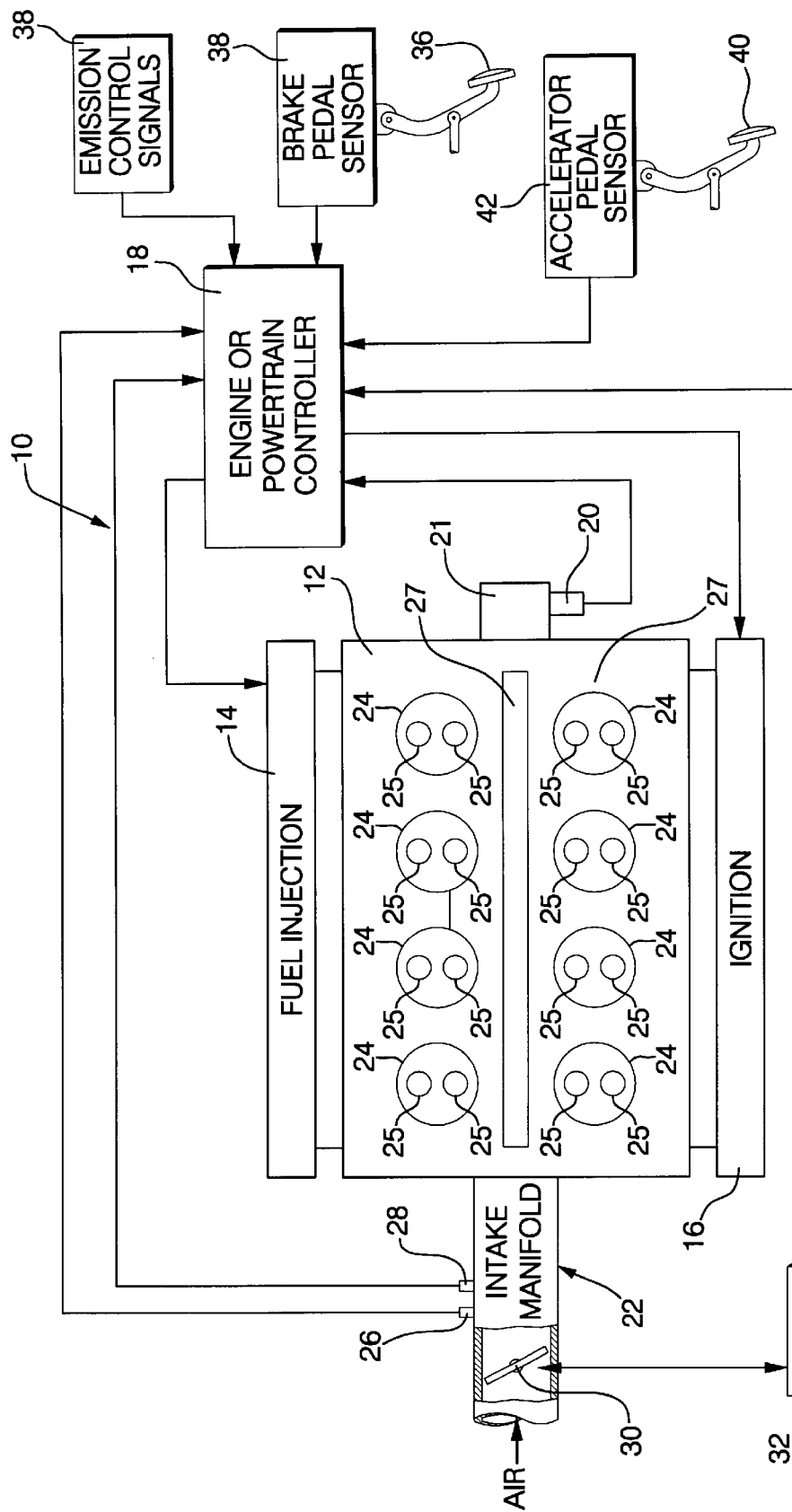
FIG. 1 is a diagrammatic drawing of the control system of the present invention.

FIG. 1 is a diagrammatic drawing of the vehicle control system 10 of the present invention. The control system 10 includes a variable displacement ICE 12 having fuel injectors 14 and spark plugs 16 (in the case of a gasoline engine) controlled by an engine or powertrain controller 18. The ICE 12 crankshaft 21 speed and position are detected by a speed and position detector 20 that generates a signal such as a pulse train to the engine controller 18.

The ICE 12 may comprise a gasoline ICE or any other ICE known in the art. An intake manifold 22 provides air to the cylinders 24 of the ICE 10, the cylinders having valves 25. The valves 25 are further coupled to an actuation apparatus such as used in an overhead valve (OHV) or overhead cam (OHC) engine configuration that may be physically coupled and decoupled to the valves 25 to shut off air flow through the cylinders 24. An air flow sensor 26 and manifold air pressure (MAP) sensor 28 detect the air flow and air pressure within the intake manifold 22 and generate signals to the powertrain controller 18. The air flow sensor 26 is preferably a hot wire anemometer, and the MAP sensor 28 is preferably a strain gauge.

An electronic throttle 30 having a throttle plate controlled by an electronic throttle controller 32 controls the amount of air entering the intake manifold 22. The electronic throttle 30 may utilize any known electric motor or actuation technology in the art including, but not limited to, DC motors, AC motors, permanent magnet brushless motors, and reluctance motors. The electronic throttle controller 32 includes power circuitry to modulate the electronic throttle 30 and circuitry to receive position and speed input from the electronic throttle 30. In the preferred embodiment of the present invention, an absolute rotary encoder is coupled to the electronic throttle 30 to provide speed and position information to the electronic throttle controller 32. In alternate embodiments of the present invention, a potentiometer may be used to provide speed and position information for the electronic throttle 30. The electronic throttle controller 32 further includes communication circuitry such as a serial link or automotive communication network interface to communicate with the powertrain controller 18 over an automotive communications network 33. In alternate embodiments of the present invention, the electronic throttle controller 32 may be fully integrated into the powertrain controller 18 to eliminate the need for a physically separate electronic throttle controller.

A brake pedal 36 in the vehicle is equipped with a brake pedal sensor 38 to determine the amount of pressure generated by an operator of the vehicle on the brake pedal 36. The brake pedal sensor 36 generates a signal to the powertrain controller 18 to determine a braking condition for the vehicle. A braking condition will indicate a low torque/low demand condition for the variable displacement ICE 12. An accelerator pedal 40 in the vehicle is equipped with a pedal position sensor 42 to sense the position of the accelerator pedal. The pedal position sensor 42 signal is also communicated to the powertrain controller 18. In the preferred embodiment of the present invention, the brake pedal sensor 38 is a strain gauge and the pedal position sensor 42 is an absolute rotary encoder. Emission control signals 19 are further integrated into the control system 10 to monitor and control ICE emissions.

Figure 2:
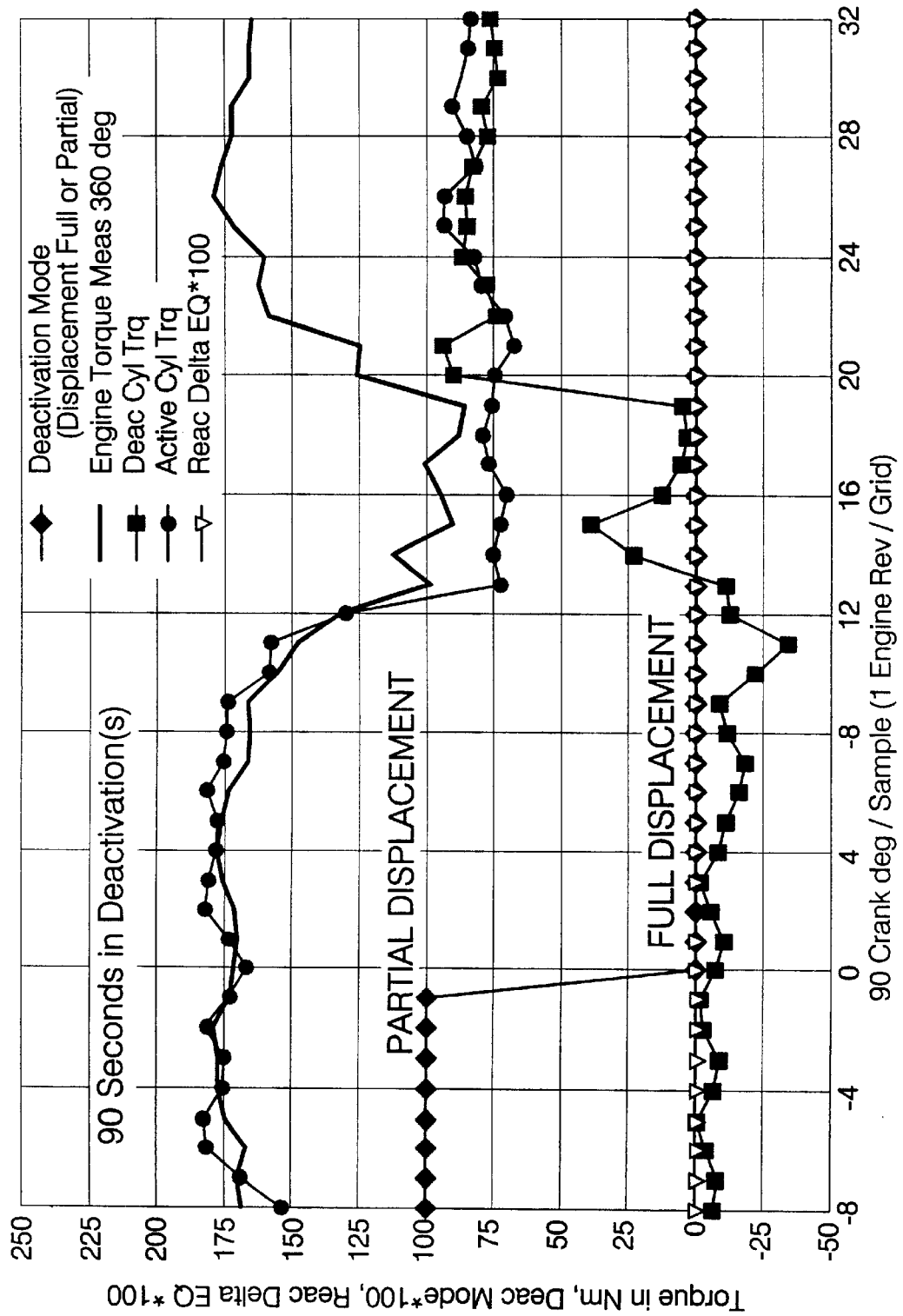
FIG. 2 is a plot of engine torque upon reactivation of a cylinder for a variable displacement ICE without compensation for fuel and spark.
Figure 3:
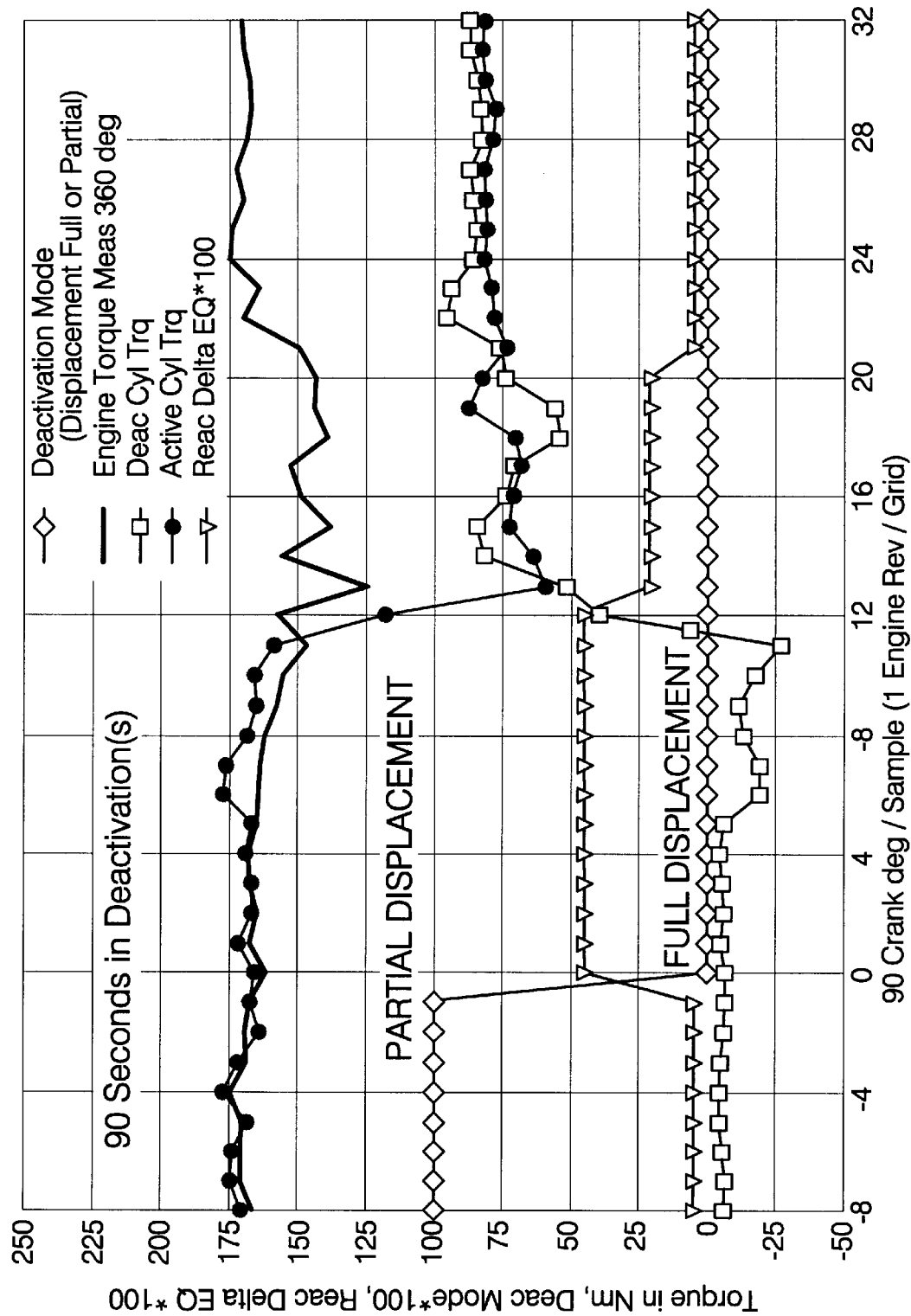
FIG. 3 is a plot of engine torque upon reactivation of a cylinder for a variable displacement ICE with fuel and spark compensation to stabilize engine torque.

To enable smooth transitions between a partially-displaced configuration and fully-displaced configuration for the ICE 12, the throttle is modulated and spark advance/retard is controlled to make the transitions transparent to the operator of the vehicle. As previously described, during the initial transition of a cylinder 24 from a deactivated to reactivated condition, the variable displacement ICE 12 may not immediately return to the desired torque output due to partial burns or misfires. Referring to FIGS. 2 and 3, FIG. 2 includes a plot of torque for a variable displacement ICE with a reactivating cylinder 24, lacking compensation in spark advance and fuel enrichment. FIG. 3 includes a plot of torque for a variable displacement ICE with a reactivating cylinder 24 having torque compensation in the form of spark advance/retard and fuel enrichment. As seen in FIG. 2, there is a dip in torque upon reactivation of a cylinder 24, and, as seen in FIG. 3, this torque dip may be compensated by varying spark and enriching the fuel mixture for the reactivated cylinder 24.

Figure 4:
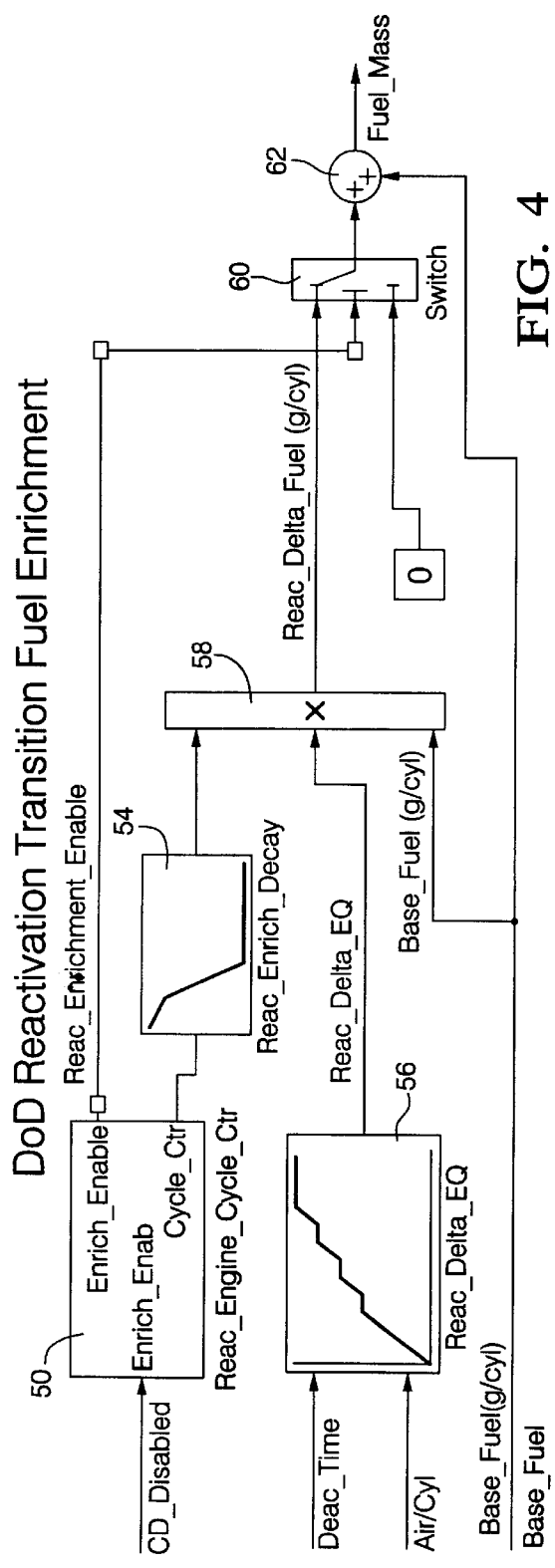
FIG. 4 is a control block diagram for fuel enrichment of a cylinder upon reactivation.
Figure 5:
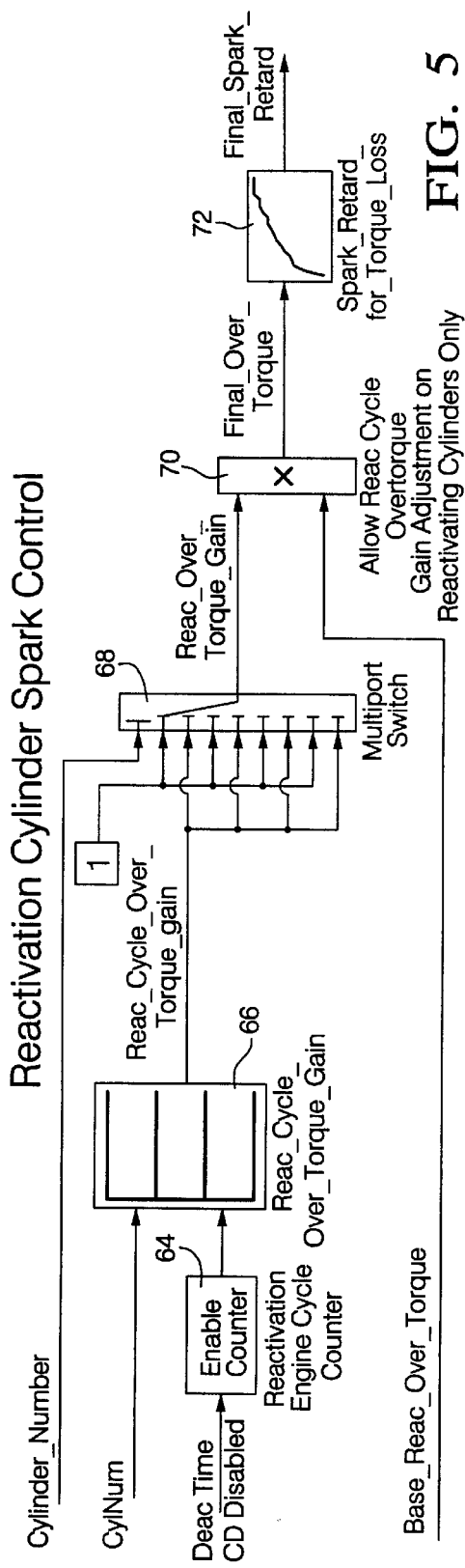
FIG. 5 is a control block diagram for spark control of a cylinder upon reactivation.

FIGS. 4 and 5 are control block diagrams illustrating the torque compensation for the variable displacement ICE 12 upon reactivation of a cylinder 24 using spark advance/retard and fuel enrichment. To characterize fuel enrichment, the following description for an air-fuel mixture is included. An air-fuel mixture is represented by a ratio called the equivalence ratio which is represented by the symbol X. The equivalence ratio is defined by the following equation:

$$\lambda = \frac{(\text{air}/\text{fuel})}{(\text{air}/\text{fuel stoichiometry})}$$

A relatively low air/fuel ratio below 14.7 ($\lambda<1$) is characterized as a rich mixture, and an air/fuel ratio above 14.7 ($\lambda>1$) can be characterized as a lean mixture.

FIG. 4 illustrates the fuel enrichment control scheme upon reactivation of a cylinder 24 in the variable displacement ICE 12. The control scheme of FIG. 4 is executed every firing event and, in the case of a V8 engine, every 90 degree rotation of the ICE 12 crankshaft 21. The inputs cylinder deactivation disabled (CD_Disable), the continuous time spend in partial displacement (Deac_Time), base fuel mass (Base_Fuel), and the air flow per cylinder (Air/Cyl) are used to determine the fuel enrichment for the reactivating cylinder 24. CD_Disable is a flag that indicates that the variable displacement ICE is reactivating a cylinder 24. The signal CD_Disable is processed by the reactivation engine cycle counter block 50, where block 50 counts the complete engine cycles based on cylinder events (eight for a V8 engine). The cycle counter of block 50 tracks when to enrich a cylinder 24 upon reactivation. A reactivation enrichment decay table in block 54 is used to allow the fuel enrichment quantity to be reduced with each subsequent engine cycle following a reactivation. The decay tables in block 54 use the minimum fuel enrichment necessary to stabilize the torque generated by a reactivated cylinder 24. The decay table of block 54 keeps track of engine cycle to determine the amount of fuel enrichment needed to maintain engine torque for each cycle after reactivation.

The variable Deac_Time is defined as the total continuous time the reactivating cylinder 24 has been deactivated. The Deac_Time is limited, preferably to two minutes such that the transients are accounted for during cylinder 24 reactivation. The reactivation delta equivalence (Reac_Delta_EQ) is generated by a table at block 56 based on the time in deactivated mode and the air/cylinder as an indicator of engine load. The Reac_Delta_EQ is the amount of extra fuel above the normal stoichiometric fueling (Base_Fuel) needed to maintain engine torque as determined by the table in block 56. At block 58, the Reac_Delta_EQ and Reac_Enrich_Decay variables are multiplied with a current base fuel (Base_Fuel) to compute a reactivating delta fuel in grams/cylinder; Reac_Delta_Fuel=Reac_Delta_EQ× Reac_Enrich_Decay×Base_Fuel. A selector block 60 determines whether the Reac_Delta_Fuel will be added to the Base_Fuel at addition block 62 based on the state of the flag Reac_Enrichment_Enable. If a cylinder 24 is reactivating in the ICE 12, Reac_Enrichment_Enable will be true and the Reac_Delta_Fuel will be added to the Base_Fuel to determine the Fuel_Mass for a cylinder 24. When Reac_Enrichment_Enable is false, the Reac_Delta_Fuel will not be added to the Base_Fuel, as a cylinder 24 has finished reactivating or is deactivated.

FIG. 5 illustrates the reactivation cylinder spark control scheme of the present invention. The control scheme of FIG. 5 is executed every firing event similar to the control scheme of FIG. 4. Inputs to the control diagram of FIG. 5 include the cylinder number (Cyl_Num) (a counter representing the current cylinder on its compression stroke in preparation for combustion), Deac_Time, and CD_Disabled. Block 64 counts complete engine cycles between the deactivation and reactivation of a cylinder 24. The Deac_Time and counter in block 64 are processed by block 66 to select from a table the reactivation cycle over torque gain (Reac_Cycle_Over_Torque_Gain). Over_Torque is the amount of excess torque present at the start of a cylinder reactivation due to excess air per cylinder. The Reac_Cycle_Over_Torque_Gain is the amount of the reduction of Over_Torque needed, in combination with fuel enrichment, to stabilize the torque generated by the reactivation cylinder 24 and the overall engine 12 torque. Selector block 68 uses Cylinder_Number to determine if a cylinder 24 currently next for spark delivery is a previously deactivated cylinder that will receive a reduced spark retard (gain<1, based on reduction in Over_Torque) or a continuously active cylinder that will receive the full spark retard (gain=1). Final_Over_Torque for the cylinder 24 is calculated in Block 70 by multiplication of the React_Over_Torque_Gain and Base_Reac_Over_Torque reduction. In block 72, the final spark retard is determined from a look-up table or equation of Spark_Retard vs. Over_Torque.

The method and apparatus of the present invention compensates for the transient engine torque drops in a variable displacement ICE 12 by increasing the torque output of a reactivating cylinder 24 using fuel enrichment and spark advance/retard.

While this invention has been described in terms of some specific embodiments, it will be appreciated that other forms can readily be adapted by one skilled in the art. Accordingly, the scope of this invention is to be considered limited only by the following claims.

What is claimed is:

1. An engine control system in a vehicle comprising:

a variable displacement internal combustion engine;

an intake manifold coupled to said variable displacement internal combustion engine;

a controller for controlling the displacement of said variable displacement internal combustion engine;

wherein said controller varies the spark for a reactivating cylinder during a transition from deactivation to reactivation; and wherein said controller determines a reactivation cycle gain based on a time the cylinder is in a deactivated state and the engine cycle.

2. The engine control system of claim 1 wherein said controller advances the spark for a reactivation cylinder during a transition from deactivation to reactivation.

3. The engine control system of claim 1 wherein said controller retards the spark for a reactivation cylinder during a transition from deactivation to reactivation.

4. The engine control system of claim 1 wherein said controller enriches the fuel for a cylinder during the reactivation of the cylinder.

5. The engine control system of claim 1 wherein said variable displacement internal combustion engine is an eight-cylinder engine.

6. The engine control system of claim 1 wherein said variable displacement internal combustion engine is an overhead valve engine.

7. The engine control system of claim 1 wherein said variable displacement internal combustion engine is an overhead cam engine.

8. A method of controlling the displacement of a variable displacement internal combustion engine comprising the step of:
   enriching the fuel mixture for a cylinder upon reactivation of the cylinder; and
   determining a spark reactivation cycle gain based on a time the cylinder is in a deactivated state.

9. The method of claim 8 further comprising the step of advancing the spark for the cylinder upon reactivation.

10. The method of claim 8 further comprising the step of retarding the spark for the cylinder upon reactivation.

11. A method of controlling the torque output of a variable displacement internal combustion engine comprising:
    reactivating a cylinder;
    varying the spark for the cylinder by determining a reactivation cycle gain based on a time the cylinder is in a deactivated state and the engine cycle; and
    enriching the fuel mixture for the cylinder.

12. A method of controlling the torque output of a variable displacement internal combustion engine comprising:
    reactivating a cylinder;
    varying the spark for the cylinder;
    enriching the fuel mixture for the cylinder by generating a delta equivalence based on a time the cylinder is in a deactivated state and the air flow in the cylinder; and
    determining a reactivation cycle gain based on a time the cylinder is in a deactivated state and the engine cycle.

* * * * *